United States Patent
Schwarz et al.

(10) Patent No.: US 10,113,866 B1
(45) Date of Patent: Oct. 30, 2018

(54) PORTABLE AXLE ALIGNMENT APPARATUS AND METHOD

(71) Applicants: Daniel Schwarz, Wyoming, MI (US); Henry Schwarz, Grand Rapids, MI (US)

(72) Inventors: Daniel Schwarz, Wyoming, MI (US); Henry Schwarz, Grand Rapids, MI (US)

( * ) Notice: Subject to any disclaimer, the term of this patent is extended or adjusted under 35 U.S.C. 154(b) by 206 days.

(21) Appl. No.: 15/296,260

(22) Filed: Oct. 18, 2016

(51) Int. Cl.
*G01B 11/275* (2006.01)

(52) U.S. Cl.
CPC ...... *G01B 11/2755* (2013.01); *G01B 2210/30* (2013.01)

(58) Field of Classification Search
CPC ...... G01B 5/255; G01B 7/315; G01B 11/275; G01B 11/2755
USPC ................................. 33/203, 203.18
See application file for complete search history.

(56) References Cited

U.S. PATENT DOCUMENTS

| | | | | |
|---|---|---|---|---|
| 3,691,642 A * | 9/1972 | Nolte | ........................ | G01B 5/25 33/193 |
| 4,347,668 A * | 9/1982 | Johnston | ................ | G01B 5/255 33/1 N |
| 4,942,667 A * | 7/1990 | Fournier | .............. | G01B 11/275 33/228 |
| 5,056,231 A * | 10/1991 | Alusick | ................... | G01B 5/255 33/203.18 |
| 5,157,838 A * | 10/1992 | Sims | ...................... | G01B 5/255 33/203.18 |
| 5,367,778 A * | 11/1994 | O'Hara | ................... | G01B 5/255 33/193 |
| 5,675,408 A * | 10/1997 | Samuelsson | ......... | G01B 11/275 356/155 |
| 5,852,241 A * | 12/1998 | Fagerdahl | ........... | B01F 15/0206 73/487 |
| 6,082,011 A * | 7/2000 | Phillips, III | ......... | G01B 11/275 33/203.15 |
| 6,282,799 B1 * | 9/2001 | Warkotsch | ............. | G01B 5/255 33/203 |
| 6,522,400 B1 * | 2/2003 | Horn | .................... | G01B 11/275 356/138 |
| 6,718,646 B2 * | 4/2004 | Corghi | ................... | G01B 5/255 33/203.18 |
| 6,799,376 B1 * | 10/2004 | Voeller | .................. | G01B 5/255 33/203 |
| 7,913,404 B1 * | 3/2011 | Smith | ................ | G01B 11/2755 33/203.18 |
| 7,941,935 B2 * | 5/2011 | Khan | ..................... | G01B 5/255 33/288 |
| 8,401,236 B2 * | 3/2013 | Kassouf | ............ | G01B 11/2755 382/104 |
| 2005/0115088 A1 * | 6/2005 | Paulsen | .................. | G01B 5/255 33/203.18 |

(Continued)

*Primary Examiner* — G. Bradley Bennett

(57) ABSTRACT

A portable laser emitter, laser targets, and method for aligning commercial truck and trailer axles are disclosed. The laser emitter is mounted to the wheel of a truck drive axle while the laser targets are mounted to the truck's steer wheels. Measurements are taken of the laser dot position on the laser targets for both ends of the axle. The measurements taken from either end of the axle are compared to determine the angle of the drive axle. This method may also be applied to a commercial trailer by using a floor standing laser target centered on the trailer king pin.

9 Claims, 3 Drawing Sheets

(56) References Cited

U.S. PATENT DOCUMENTS

| | | | |
|---|---|---|---|
| 2013/0239420 A1* | 9/2013 | Kroll | G01B 11/275 33/228 |
| 2015/0048225 A1* | 2/2015 | Liu | B25B 11/002 248/206.5 |
| 2017/0158241 A1* | 6/2017 | Prusinowski | B62D 17/00 |

* cited by examiner

FIGURES

PORTABLE AXLE ALIGNMENT APPARATUS AND METHOD

CROSS-REFERENCE TO RELATED PRIOR APPLICATIONS

This application claims the filing date of provisional patent application Ser. No. 62/269,923 filed Dec. 18, 2015 by the present inventors.

BACKGROUND

The following table indicates prior art that appears to be relevant to the invention disclosed:

| U.S. Patents | | | |
| --- | --- | --- | --- |
| Pat. No. | Kind Code | Issue Date | Patentee |
| 8,401,236 | B2 | Mar. 19, 2013 | Kassouf et al. |
| 7,941,935 | B2 | May 17, 2011 | Khan |
| 7,913,404 | B1 | Mar. 29, 2011 | Smith |
| 6,799,376 | B1 | Oct. 5, 2004 | Voeller et al. |
| 6,718,646 | B2 | Apr. 13, 2004 | Corghi |
| 6,522,400 | B1 | Feb. 18, 2003 | Horn |
| 6,282,799 | B1 | Sep. 4, 2001 | Warkotsch |
| 6,082,011 | | Jul. 4, 2000 | Philips, III |
| 5,675,408 | | Oct. 7, 1997 | Samuelsson et al. |
| 5,367,778 | | Nov. 29, 1994 | O'Hara |
| 5,157,838 | | Oct. 27, 1992 | Sims |
| 5,056,231 | | Oct. 15, 1991 | Alusick et al. |
| 4,942,667 | | Jul. 24, 1990 | Fournier |
| 4,347,668 | | Sep. 7, 1982 | Johnston |
| 3,691,642 | | Sep. 19, 1972 | Nolte et al. |

The commercial trucking industry's profit margin is heavily dependent on the cost of fuel and tires. These two consumables can both be conserved by reducing rolling resistance of the truck and trailer wheels. The simplest way to reduce rolling resistance is to maintain alignment of the axles which are prone to becoming misaligned under heavy loading.

Many commercial trucking businesses are not equipped with alignment tools necessary to maintain their fleet of trucks and trailers. Instead they routinely send their vehicles to alignment shops that use complex and expensive alignment systems such as described in U.S. Pat. No. 8,401,236. The high cost associated with this type of alignment system, coupled with rising fuel and tire prices, has led to the development of simple, inexpensive, and portable alignment systems such as described in U.S. Pat. No. 7,913,404. However this type of alignment system is more prone to measurement error due to its dependence on less reliable measurement references and constraints.

The commercial trucking industry needs an axle alignment system that is simple, inexpensive, portable, and less susceptible to measurement error than alignment systems currently offered by the market. An alignment system that achieves these objectives will be disclosed.

SUMMARY OF THE INVENTION

The present invention is an axle alignment system for aligning truck drive axles and trailer axles. The system includes a laser emitter, truck laser targets, a trailer laser target, a king pin centering tool, and mounting bracketry. When aligning a truck axle the trailer target apparatus is not necessary. When aligning a trailer axle the truck target apparatus is not necessary. The laser emitter is mounted to a wheel such that the laser beam is projected perpendicular to the axis of the axle in question. A measurement is taken off the corresponding target(s) from both ends of the axle in question. A comparison of the measurements from either end of the axle is used to determine the angle of the axle and a phone application is used to determine what the measurements should be when the axle is aligned.

The primary advantage of this axle alignment system is that it only requires one laser emitter. Since the same laser emitter is used to take measurements on both ends of the axle in question, any error in parallelism within the laser emitter assembly is negated when the laser is flipped 180 degrees to measure the opposite end of the axle. The laser emitter error would be repeated in opposite directions to create a net zero error. Therefore, laser emitter calibration discrepancies produce little impact on the measurement accuracy. Additionally, a system that utilizes a single laser emitter is less costly than a system which relies on multiple lasers.

Another advantage of this axle alignment system is the large distance between the laser emitter and the laser target. The further the laser beam travels the more sensitive the measurement scale is to angular deviation of the axle. For a trailer alignment, a laser beam length of 500" produces ±0.0036 degrees of angular precision when the target scale demarcations are at 1/16" increments. For a truck alignment, a laser beam length of 215" produces ±0.0083 degrees of angular precision when the target scale demarcations are at 1/16" increments. This allows the user to align the axle with greater precision than if the beam was projected a shorter distance.

Yet another advantage of this axle alignment system is that the laser emitter and targets are constrained using reliable constraints. Precisely machined surfaces on the laser emitter and targets are mated with precisely machined surfaces on the truck or trailer reference features. All degrees of freedom between the alignment apparatus and vehicle are completely constrained with tight clearances between mating features. These reliable references and constraints produce measurements that are both accurate and repeatable.

DETAILED DESCRIPTION OF THE PREFERRED EMBODIMENTS

Figure 1:
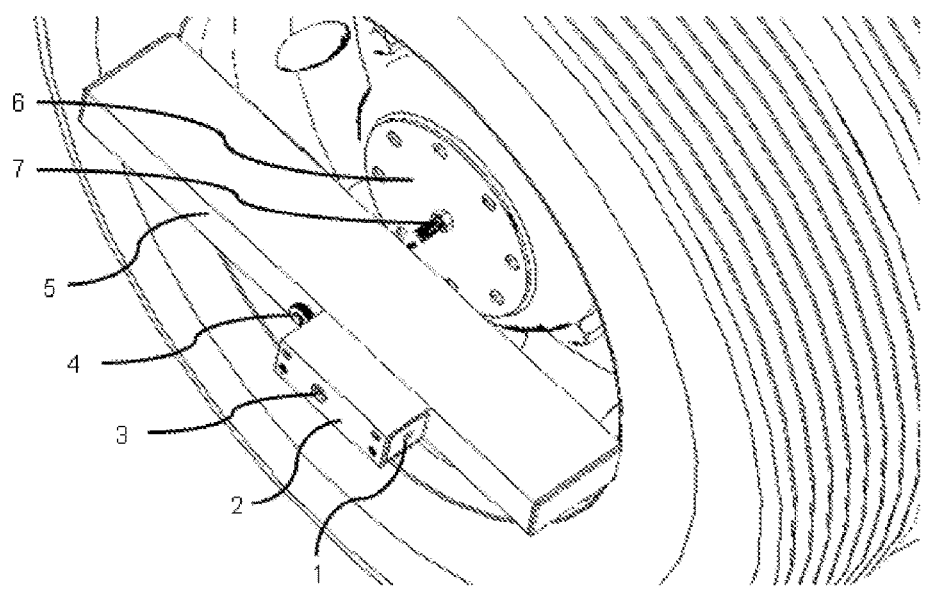
FIG. 1 is a top down perspective of the laser emitter assembly mounted to the wheel of an axle in need of alignment.

The preferred embodiment of the laser emitter assembly is illustrated by FIG. 1. Centering plate 6 is fastened to the hub by aligning the hole pattern with the hub bolts. Centering pin 7 is threaded into centering plate 6. Laser reference tube 5 is constrained to the wheel rim using centering pin 7 and thumb nut 4. Laser housing 2 is constrained to the laser reference tube 5 with threaded fasteners. Laser diode 1 is press fit into a precision bore in the front of the laser housing 2. The laser diode 1 projects a laser beam when the battery power switch 3 is activated. The laser beam is emitted parallel to the surface plane of the wheel rim due to the constraints between the laser diode 1, laser housing 2, laser reference tube 5, and the rim of the wheel.

Figure 2:
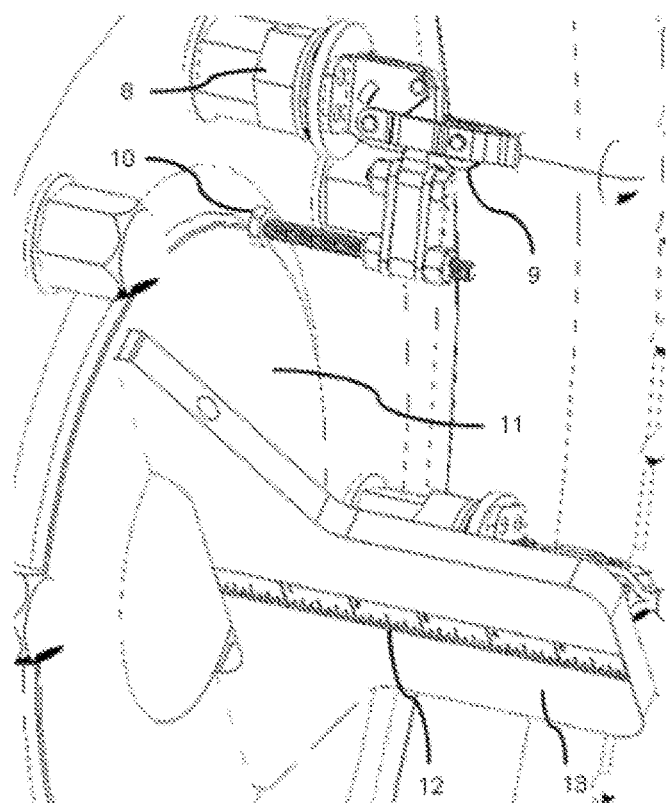
FIG. 2 is a top down perspective of the truck target assembly mounted to a steer axle wheel.

The preferred embodiment of the truck laser target assembly is illustrated by FIG. 2. Clamp nut 8 is threaded onto a lug of the steer wheel of interest. Toggle clamp 9 is constrained to clamp nut 8 with a weld between the flange ring of clamp nut 8 and the mounting base of toggle clamp 9. The flange ring swivels freely, allowing toggle clamp 9 to be rotated relative to clamp nut 8 which is affixed to the wheel lug. Clamp bolt 10 is fastened to the end of the toggle clamp 9 armature. Clamp bolt 10 presses the bore reference features of wheel target base 11 into the center bore of the steer wheel. Wheel target plate 13 is fastened perpendicular to wheel target base 11. A measurement scale 12 is adhered to the wheel target plate 13.

Figure 3:
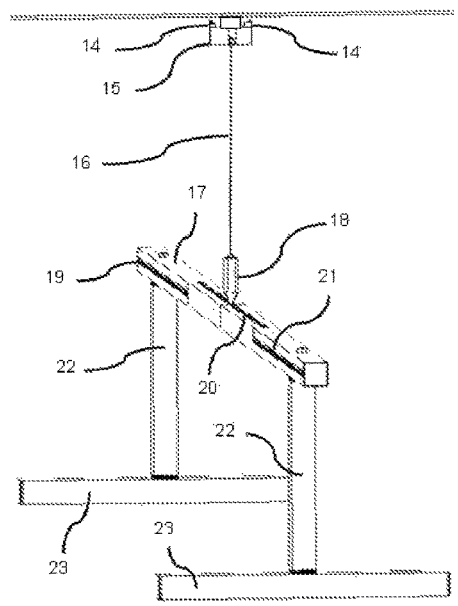
FIG. 3 is a side perspective of the trailer target assembly aligned to a trailer king pin.

The preferred embodiments of the trailer laser target assembly and king pin centering tool assembly are illustrated by FIG. 3. The inner bore of kingpin tube 15 is aligned with the king pin and constrained to the kingpin using cams 14. A plumbob 18 hangs from the center of the king pin tube 15 by a string 16. The plumbob is used to center the trailer target assembly with the centerline of the kingpin. The trailer target assembly consists of horizontal leg tubes 23, vertical leg tubes 22, a target tube 17, and measurement scales 19, 20, and 21. The target tube 17 is roughly aligned parallel to the axle in need of alignment.

Figure 4:
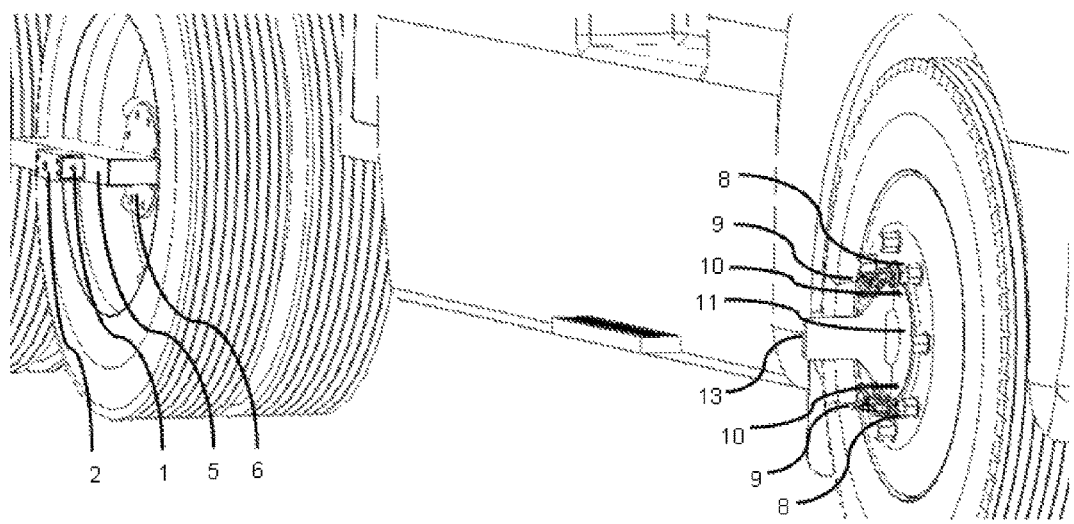
FIG. 4 is a side perspective showing the operation of the laser alignment system as it relates to a truck drive axle in need of alignment.

To align a truck axle, one must (1) adjust the lateral offset of the axle relative to the truck frame according to manufacturer specifications, (2) constrain the laser emitter to a drive axle wheel as illustrated in FIG. 1, (3) constrain the truck target assembly to the steer wheel bore as illustrated in FIG. 2, (4) turn the laser emitter on and aim the beam at target 13 as illustrated in FIG. 4, (5) measure the laser position on measurement scale 12 as illustrated in FIG. 2, (6) enter the measurement into a spreadsheet or phone application that calculates the ideal laser position for proper alignment, (7) repeat steps (2-6) on the opposite end of the axle, and (8) adjust the axle alignment and repeat steps (2-6) until the laser dot falls within the tolerance window calculated by the spreadsheet or phone application.

Figure 5:
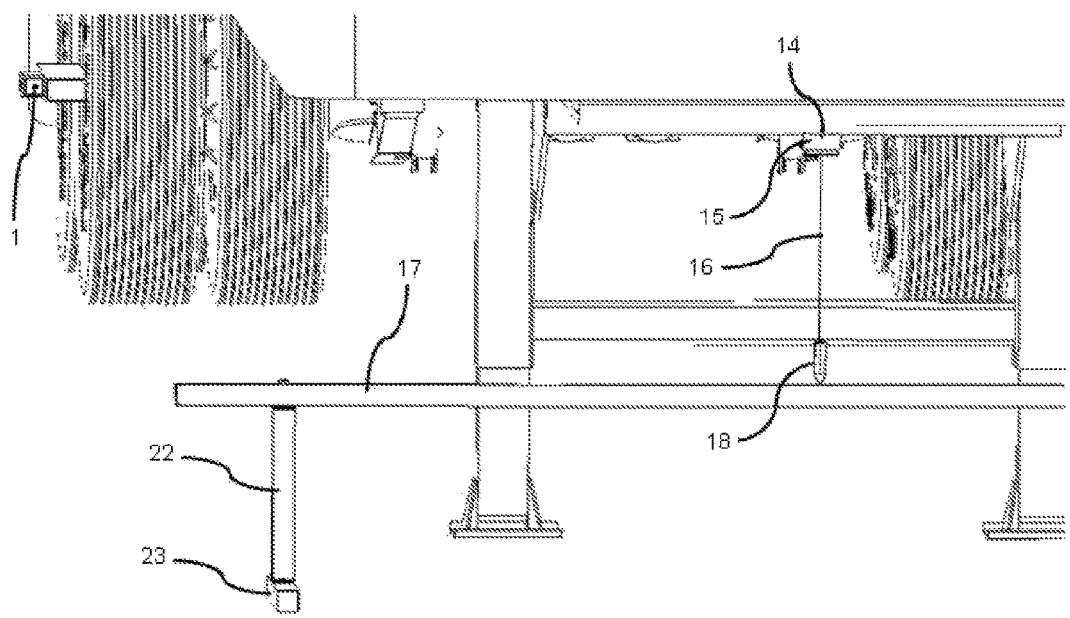
FIG. 5 is a side perspective showing the operation of the laser alignment system as it relates to a trailer axle in need of alignment.

To align a trailer axle, one must (1) adjust the lateral offset of the axle relative to the trailer frame according to manufacturer specifications, (2) constrain the laser emitter to a wheel as illustrated in FIG. 1, (3) align the trailer target assembly with the kingpin centering tool as illustrated in FIG. 3, (4) turn the laser emitter on and aim the beam at target 17 as illustrated in FIG. 5, (5) measure the laser position on measurement scale 21 as illustrated in FIG. 3, (6) enter the measurement into a spreadsheet or phone application that calculates the ideal laser position for proper alignment, (7) repeat steps (2-6) on the opposite end of the axle, and (8) adjust the axle alignment and repeat steps (2-6) until the laser dot falls within the tolerance window calculated by the spreadsheet or phone application.

The preceding disclosures of preferred embodiments are in no way intended to limit the listed claims. The devices described in these claims may be manufactured using various materials, may take on forms other than the illustrated embodiments, and may be used for aligning axles of various types.

We claim:

1. Apparatus for aligning an axle of a vehicle which comprises,

A laser emitter that emits a laser beam substantially perpendicular to the axis of a wheel when said laser emitter is held against said wheel's outer flange wherein said wheel is mounted substantially coaxial with said axle, A plurality of laser targets detachably mounted to said vehicle's steer wheels, A plurality of elongate measurement scales mounted to said laser targets protruding away from said vehicle and substantially coaxial to said steer wheels when said laser targets are detachably mounted to said steer wheels.

2. Apparatus of claim 1 wherein said laser emitter is held against said outer flange by a threaded rod connected to a bracket detachably mounted to said wheel's hub lugs.

3. Apparatus of claim 1 wherein said laser targets have cylindrical features that mate with the inner bore of said steer wheels whereby said measurement scales are aligned coaxially with said steer wheels.

4. Apparatus of claim 1 wherein said laser targets are detachably mounted by a plurality of adjustable swiveling toggle clamps detachably mounted to said vehicle's steer hub lugs.

5. Apparatus for aligning an axle of a trailer which comprises,

A laser emitter that emits a laser beam substantially perpendicular to the axis of a wheel's outer rim when said emitter is held against said wheel's outer rim wherein said wheel's outer rim is mounted substantially coaxial with said axle, A tube detachably mounted to said trailer's kingpin that supports a substantially balanced conical weight which hangs from said tube by a cord substantially coaxial with said kingpin whereby said conical weight indicates the center of said kinpin, A free standing laser target with a plurality of elongate measurement scales mounted to said laser target approximately parallel with the ground and projecting away from both sides of a substantially centered mark on said laser target whereby said laser target is approximately centered beneath said kingpin as indicated by said conical weight.

6. Apparatus of claim 5 wherein said laser emitter is held against said outer flange by a threaded rod connected to a bracket detachably mounted to said wheel's hub lugs.

7. Apparatus of claim 5 wherein said tube is detachably mounted to said kingpin by a plurality of cams pivotally mounted to the top of said tube whereby said tube may be selectively constrained to said kingpin's flange.

8. A method of aligning a vehicle axle which comprises,

Constraining a first side laser target to a first side steer wheel of said vehicle such that the attached elongate measurement scales are oriented coaxially with said first side steer wheel, Constraining a laser emitter to a first side wheel mounted substantially coaxial to said axle such that the laser beam is projected substantially perpendicular to the axis of said first side wheel, Measuring the first side laser dot position projected on said first side laser target, Constraining a second side laser target to a second side steer wheel of said vehicle such that the attached elongate measurement scales are oriented coaxially with said second side steer wheel, Constraining said laser emitter to a second side wheel mounted substantially coaxial to said axle such that the laser beam is projected substantially perpendicular to the axis of said second side wheel, Measuring the second side laser dot position projected on said second side laser target, Using said measurements to calculate a new first side laser dot position and a new second side laser dot position whereby said axle would be in correct alignment, Adjusting said axle to produce said new first side laser dot position and said new second side laser dot position.

9. A method of aligning a trailer axle which comprises,

Constraining a tube to said trailer's kingpin that supports a substantially balanced conical weight which hangs from said tube by a cord substantially coaxial with said kingpin whereby said conical weight indicates the center of said kingpin, Aligning a floor standing laser target such that a substantially centered marking on said floor standing laser target is directly beneath said conical weight and the measurement scales attached to said floor standing laser target are oriented approximately parallel to said axle, Constraining a laser emitter to a first side wheel mounted substantially coaxial to said axle such that the laser beam is projected substantially perpendicular to the axis of said first side wheel, Measuring the first side laser dot position projected on said floor standing laser target relative to said substantially centered marking, Constraining said laser emitter to a second side wheel mounted substantially coaxial to said axle such that the laser beam is projected substantially perpendicular to the axis of said second side wheel, Measuring the second side laser dot position projected on said floor standing laser target relative to said substantially centered marking, Using said measurements to calculate a new first side laser dot position and a new second side laser dot position whereby said axle would be in correct alignment, Adjusting said axle to produce said new first side laser dot position and said new second side laser dot position.

\* \* \* \* \*